(12) United States Patent
Umezawa

(10) Patent No.: US 7,986,436 B2
(45) Date of Patent: Jul. 26, 2011

(54) IMAGE PROCESSING APPARATUS AND METHOD

(75) Inventor: Hiroki Umezawa, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 558 days.

(21) Appl. No.: 12/126,097

(22) Filed: May 23, 2008

(65) Prior Publication Data

US 2009/0290173 A1  Nov. 26, 2009

(51) Int. Cl.
G06K 15/00 (2006.01)
(52) U.S. Cl. ......... 358/1.9; 358/518; 358/520; 358/523; 358/524; 358/3.23
(58) Field of Classification Search .......... 358/1.9, 358/3.23, 518, 520, 523, 524; 382/162, 167; 345/593, 594, 597
See application file for complete search history.

(56) References Cited

U.S. PATENT DOCUMENTS

| | | | |
|---|---|---|---|
| 6,781,716 B1 * | 8/2004 | Yoda | 358/1.9 |
| 7,085,006 B2 * | 8/2006 | Yokoyama et al. | 358/1.9 |
| 7,142,711 B2 * | 11/2006 | Goto et al. | 382/167 |
| 7,333,237 B2 * | 2/2008 | Ogatsu et al. | 358/1.9 |
| 2004/0036898 A1 * | 2/2004 | Takahashi | 358/1.9 |
| 2004/0264772 A1 * | 12/2004 | Une | 382/167 |
| 2007/0052987 A1 * | 3/2007 | Jung | 358/1.9 |
| 2007/0273942 A1 * | 11/2007 | Miyata | 358/518 |
| 2008/0143738 A1 * | 6/2008 | Woolfe et al. | 345/597 |

OTHER PUBLICATIONS http://www.gretagmacbeth.com/index/products/products_color-mgmt-spec/products_professional-cm/products_pm5-publish/products_pm5publish_docs.htm, Feb. 2, 2005.

* cited by examiner

Primary Examiner — Kimberly A Williams
(74) Attorney, Agent, or Firm — Foley & Lardner LLP

(57) ABSTRACT

A method and apparatus of adjusting color conversion parameters to be used by a color printer for printing documents or images, includes receiving a user input designating a color conversion parameter to be adjusted. It also includes obtaining information as to at least one other color conversion parameter that is related to the user designated color conversion parameter. It further includes adjusting the user designated color conversion parameter based on a user selection of source color-to-destination color change, and adjusting the at least one other color conversion parameter related to the user designated color conversion parameter based on the same user selection of source color-to-destination color change.

24 Claims, 11 Drawing Sheets

| Address | | | Data | | | |
|---|---|---|---|---|---|---|
| L* | a* | b* | C | M | Y | K |
| 0 | 0 | 0 | C1 | M1 | Y1 | K1 |
| 0 | 0 | 10 | C2 | M2 | Y2 | K2 |
| 0 | 0 | 20 | C3 | M3 | Y3 | K3 |
| ...... | ...... | ...... | ...... | ...... | ...... | ...... |
| 0 | 10 | 0 | C12 | M12 | Y12 | K12 |
| ...... | ...... | ...... | ...... | ...... | ...... | ...... |
| 10 | 0 | 0 | C100 | M100 | Y100 | K100 |
| ...... | ...... | ...... | ...... | ...... | ...... | ...... |
| ...... | ...... | ...... | ...... | ...... | ...... | ...... |
| ...... | ...... | ...... | ...... | ...... | ...... | ...... |
| 100 | 100 | 100 | C1331 | M1331 | Y1331 | K1331 |

Fig.3  PRIOR ART

Color Conversion Parameter

X : Inputted L*a*b*

⬇ Extract 8 points neighboring the inputted L*a*b*

(CA, MA, YA, KA)
(CB, MB, YB, KB)
........
(CH, MH, YH, KH)

⬇ Interpolation (C, M, Y, K)

| Color Mode | Resolution | Halftone | Paper | CC parameter # |
|---|---|---|---|---|
| General | 600 | Smooth | Normal | 1 |
| | 600 | Smooth | Thick | 2 |
| | 600 | Detail | Normal | 1 |
| | 600 | Detail | Thick | 2 |
| | 1200 | Smooth | Normal | 3 |
| | 1200 | Smooth | Thick | 4 |
| | 1200 | Detail | Normal | 5 |
| | 1200 | Detail | Thick | 6 |
| Presentation | 600 | Smooth | Normal | 7 |
| | 600 | Smooth | Thick | 8 |
| | 600 | Detail | Normal | 7 |
| | 600 | Detail | Thick | 8 |
| | 1200 | Smooth | Normal | 9 |
| | 1200 | Smooth | Thick | 10 |
| | 1200 | Detail | Normal | 11 |
| | 1200 | Detail | Thick | 12 |
| Photographic | 600 | Smooth | Normal | 13 |
| | 600 | Smooth | Thick | 14 |
| | 600 | Detail | Normal | 13 |
| | 600 | Detail | Thick | 14 |
| | 1200 | Smooth | Normal | 15 |
| ............ | ............ | ............ | ............ | ............ |

| Address | | | | Data | | |
|---|---|---|---|---|---|---|
| C | M | Y | K | L* | a* | b* |
| 0 | 0 | 0 | 0 | L1* | a1* | b1* |
| 0 | 0 | 0 | 10 | L2* | a2* | b2* |
| 0 | 0 | 0 | 20 | L3* | a3* | b3* |
| ...... | ...... | ...... | ...... | ...... | ...... | ...... |
| 0 | 10 | 0 | 0 | L100* | a100* | b100* |
| ...... | ...... | ...... | ...... | ...... | ...... | ...... |
| 10 | 0 | 0 | 0 | L1332 | a1332* | b1332* |
| ...... | ...... | ...... | ...... | ...... | ...... | ...... |
| 100 | 100 | 100 | 100 | L14641* | a14641* | b14641* |

Fig. 10 B

# IMAGE PROCESSING APPARATUS AND METHOD

FIELD OF THE INVENTION

The present invention relates generally to a multi-function peripheral (MFP) and a method for copying a document, more particularly, to an apparatus and method of changing color adjustment parameters.

BACKGROUND OF THE INVENTION

In a conventional copier or MFP or image forming apparatus (hereinafter, for ease, collectively referred to as "copier"), when a user wants to print a document or an image in color, the user sends, by way of a personal computer (PC) 100, a postscript file (e.g., PDL) to a color printer 110, as seen in FIG. 1. The color printer 110 includes a PDL interpreter 120, which converts the PDL file to Red/Green/Blue (RGB) bitmap image. A color conversion unit 130 converts the RBG bitmap image to Cyan/Magenta/Yellow/Black (CMYK) data, whereby this conversion is done by using information provided by a color conversion parameter storage 140. In particular, the color conversion parameter storage 140 provides a color conversion parameter (CCP) to the color conversion unit 130. The color conversion unit 130 outputs the CMYK data to a printing engine 150, which prints the document or image in color, and which provides a hard copy for the user.

FIG. 2 shows, in further detail, the color conversion parameter storage 140. The color conversion parameter storage 140 stores a plurality of color conversion parameters, such as CCP1, CCP2, CCP3, . . . , CCPn, whereby the color conversion parameter storage 140 is typically implemented as a color table. The color printer 110 has many different versions of color conversion parameters that are stored in the color conversion parameter storage 140. A CCP is selected from the color conversion parameter storage 140 based on one or more of the following exemplary parameters: color mode, print resolution, halftone processing, and paper type used. Based on those inputs, the proper color conversion parameter (e.g., CCP3) is output by the color conversion parameter storage 140 to the color conversion unit 130.

FIG. 3 shows contents of a 3-dimensional lookup table (3-D LUT) 300 that may be implemented in the color conversion parameter storage 140. The LUT 300 includes $L*a*b*$ data that corresponds to 'addresses' in the LUT 300, and CMYK data that corresponds to the 'data' in the LUT 300. Based on the LUT 300, $L*a*b*$ is converted to CMYK data. $L*a*b*$ data corresponds to the output color, and is a device independent color space. CMYK data corresponds to an amount of actual colors (cyan, magenta, yellow, black) to be printed on a sheet of paper.

FIG. 4 shows details of the color conversion unit 130. The color conversion unit 130 includes an RGB-to-$L*a*b*$ conversion unit 410, which outputs $L*a*b*$ data. This conversion is typically done using standard conversion equations or by using a Lookup Table. The color conversion unit 130 also includes a $L*a*b*$-to-CMYK conversion unit 420, which may be implemented by way of the 3-D LUT 300 shown in FIG. 3. The $L*a*b*$-to-CMYK conversion unit 420 is provided with a color conversion parameter (CCP) that is output from the color conversion parameter storage 140, and whereby the $L*a*b*$-to-CMYK conversion unit 420 outputs CMYK data to a printing engine (not shown, but see FIG. 1).

FIG. 5 shows a 3-D $L*a*b*$ space 500, in order to show how a color conversion table can be used to perform an interpolation so as to obtain an accurate CMYK data value from an input $L*a*b*$ data value. If an input $L*a*b*$ value is stored in the 3-D LUT 300, then the CMYK value corresponding to the input $L*a*b*$ value is obtained directly from the 3-D LUT 300. However, if the input $L*a*b*$ value is not currently stored in the 3-D LUT 300, then an interpolation can be performed in order to obtain the CMYK value that corresponds to the input $L*a*b*$ value. As shown in FIG. 5, an eight-point interpolation is performed in order to extract the eight neighboring points for an input $L*a*b*$ value, whereby a standard interpolation provides the proper CMYK value.

FIG. 6 shows a conventional color conversion parameter adjustment system 600. In order to adjust a color conversion parameter (CCP), an application (not shown) on a user's PC 610 is utilized. A user determines a source color and a destination color, and a color conversion parameter (e.g., CCP1) corresponding to the source and destination colors is determined by the application. A CCP is downloaded to the user's PC 610 from the color conversion parameter storage 140 of the color printer 110 to a color adjustment means 620 of the user's PC 610, and the user edits the CCP. In particular, the user selects one CCP to adjust, and that CCP is downloaded to the user's PC 610.

Referring now to FIG. 7A, in the source/destination color selection process, a user chooses a color to adjust from a source color display. In FIG. 7A, a scanned image is provided as a display image 710 on the user's PC 610, whereby the letter "A" is shown as having a light-red color on the user's display. The user changes that light-red color to a dark-red color, by performing an operation (e.g., mouse operation and/or keyboard operation, by selecting a destination color from a color palette provided on the display) on a pertinent area on the display (e.g., over the letter "A" region on the display). This is done in order to obtain a desired destination color, as shown in the display image 720 of FIG. 7B, whereby the letter "A" is now provided as a darker red color than the letter "A" in FIG. 7A. The color adjustment means 620 changes the CCP provided to it by the color printer 110 in accordance with the source/destination color changes made by the user, and the adjusted CCP is output to the color conversion parameter storage 140 of the color printer 110, whereby it is stored as a new CCP value.

A problem exists in the conventional CCP adjustment process in that a user can only adjust one CCP at a time. If a user desires to adjust two or more CCPs, the entire CCP adjustment process must repeat the download/edit/upload process for each CCP being adjusted. With printers having numerous CCPs, this can become a very time consuming process.

Accordingly, there exists a desire to allow for a plurality of CCPs to be adjusted in a more expedient manner.

SUMMARY OF THE INVENTION

According to an aspect of the invention, a method of adjusting a plurality of color conversion parameters includes receiving a user input designating a color conversion parameter to be adjusted. The method also includes obtaining information as to at least one other color conversion parameter that is related to the user designated color conversion parameter. The method further includes adjusting the user designated color conversion parameter based on a user selection of source color-to-destination color change, and adjusting the at least one other color conversion parameter related to the user designated color conversion parameter based on the same user selection of source color-to-destination color change.

According to another aspect of the invention, an image processing apparatus includes a color conversion designator that is configured to designate a color conversion parameter to be adjusted. The apparatus also includes a color conversion parameter list that is configured to store information concerning color conversion parameters that are related to each other, and that is configured to output related color conversion parameters to the selected color conversion parameter when the selected color conversion parameter is input thereto. The apparatus further includes a color adjustment unit that is configured to receive the selected color conversion parameter and at least one related color conversion parameter to the selected color conversion parameter, and that is configured to receive a user input corresponding to a source color-to-destination color change. The color adjustment unit adjusts the selected color conversion parameter and the at least one related color conversion parameter based on the source color-to-destination color change.

According to yet another aspect of the invention, there is provided a program product for adjusting color conversion parameters to be used by a color printer, the program product including machine-readable program code for causing, when executed, one or more machines to perform the step of receiving a user input designating a color conversion parameter to be adjusted. Also, there is performed the step of obtaining information as to at least one other color conversion parameter that is related to the user designated color conversion parameter. Further, there is performed the step of adjusting the user designated color conversion parameter based on a user selection of source color-to-destination color change, and adjusting the at least one other color conversion parameter related to the user designated color conversion parameter based on the same user selection of source color-to-destination color change.

Further features, aspects and advantages of the present invention will become apparent from the detailed description of preferred embodiments that follows, when considered together with the accompanying figures.

BRIEF DESCRIPTION OF THE DRAWINGS

FIG. 3 is a table that corresponds to a color conversion parameter table used by the conventional color printer shown in FIG. 1;

FIG. 9 is a table that corresponds to a color conversion parameter list used by the color conversion parameter adjustment system according to the first or second embodiments;

FIG. 10B is an inverse color conversion parameter table that is used by the color conversion parameter adjustment system according to the first embodiment.

DETAILED DESCRIPTION OF THE PREFERRED EMBODIMENTS

An aspect of the present invention provides for adjusting a plurality of color conversion parameters based on a selection of a single color conversion parameter to be adjusted.

Figure 8:
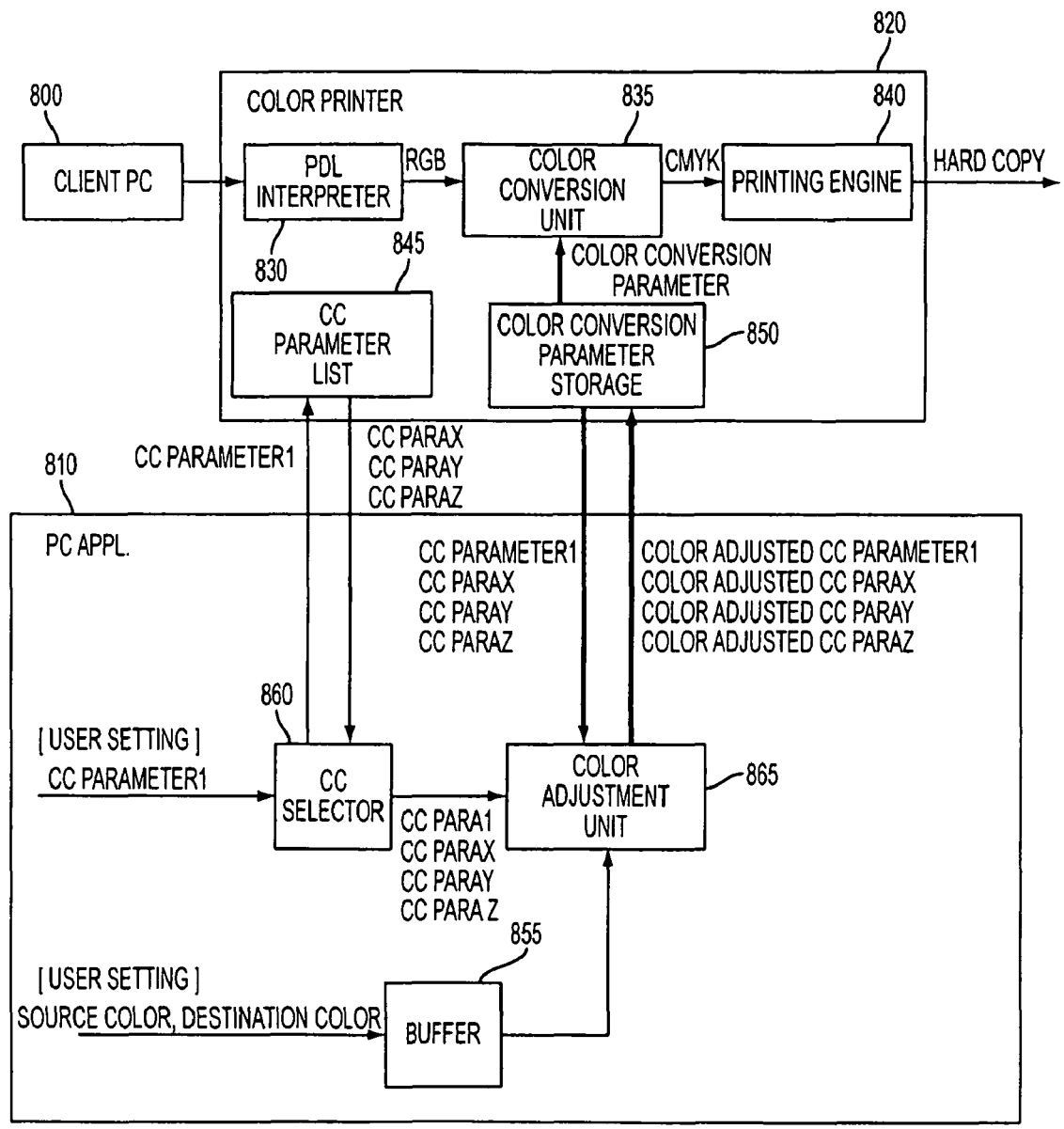
FIG. 8 is a block diagram showing components of a color conversion parameter adjustment system according to a first or second embodiment of the invention.

FIG. 8 shows a color conversion parameter adjustment apparatus according to a first embodiment of the invention. The color adjustment apparatus includes a color conversion parameter adjustment application 810 that runs on a client's PC 800, and a color printer 820. The color printer 820 includes an interpreter (e.g., PDL interpreter) 830, a color conversion unit 835, a printing engine 840, a color conversion parameter list 845, and a color conversion parameter storage 850. The application 810 includes a buffer 855, a color conversion parameter selector 860, and a color adjustment unit 865.

The client's PC 800 provides a postscript file (e.g., PDL) to the interpreter 830, whereby the interpreter 830 converts the postscript file to RGB data. The RGB data is provided to the color conversion unit 835, which converts the RGB data into CMYK data. The CMYK data is provided to a printing engine 840, which prints an image onto a sheet of paper to thereby provide a hard copy output. The color conversion parameter storage 850 provides a color conversion parameter (CCP) to the color conversion unit 835, so that the color conversion unit 835 can perform the correct RGB-to-CMYK conversion.

The color conversion selector 860 inputs a color conversion parameter (e.g., CCP1) selected by a user, and queries the color conversion parameter list 845 for all color conversion parameters (e.g., CCPX, CCPY, CCPZ) related to the selected color conversion parameter. The related color conversion parameter names are output from the color conversion parameter list 845 to the color conversion selector 860, whereby the color conversion selector 860 provides the name of the selected color conversion parameter as well as the names of all of the related color conversion parameters, to the color adjustment unit 865. The buffer 855 receives a source color-to-destination color user setting, and provides such information to the color adjustment unit 865. The color adjustment unit 865 requests the actual selected color conversion parameter and the actual related color conversion parameters from the color conversion parameter storage 850, based on names of those color conversion parameters provided to the color conversion parameter storage 850. Based on those inputs, the color adjustment unit 865 adjusts the input color conversion parameters according to the user's selection, and outputs the adjusted color conversion parameters to be stored in the color conversion parameter storage 850.

By way of the first embodiment, a user can adjust several CCPs automatically, by choosing one CCP and having the apparatus automatically determine all related CCPs to be adjusted automatically in accordance with the adjusted CCP. In more detail, a user chooses a CCP, e.g., CCP1. The color conversion selector 860 requests a lists of related CCPs from the color conversion parameter list 845, and the color conversion parameter list 845 provides a list of related CCPs to the color conversion selector 860. That information is preferably stored in a table in the color conversion parameter list 845. Another possible implementation is allowing the user to define or select the related CCPs for adjustment, such as by presenting a menu or the like to the user.

Figure 1:
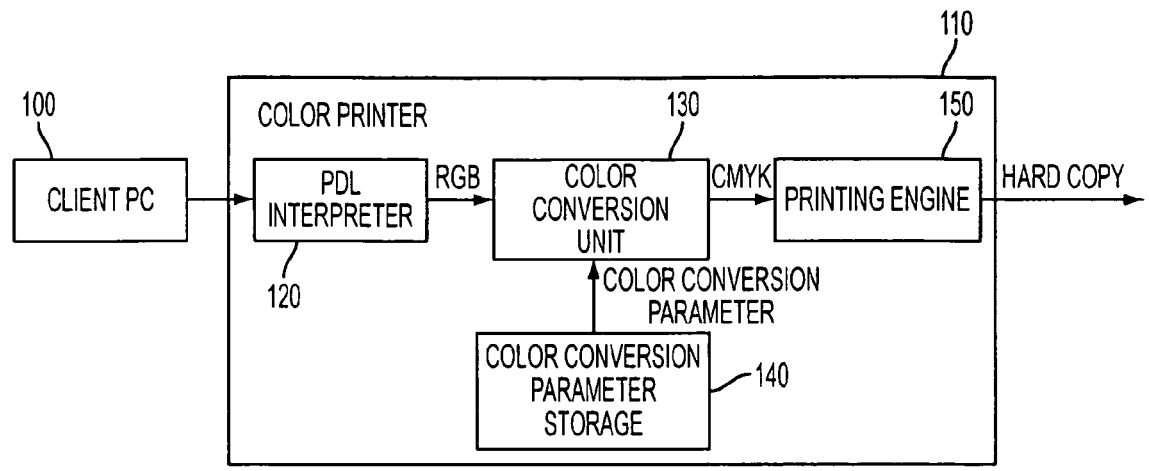
FIG. 1 is a block diagram showing color conversion adjustment parameter components of a conventional color printer.
Figure 2:
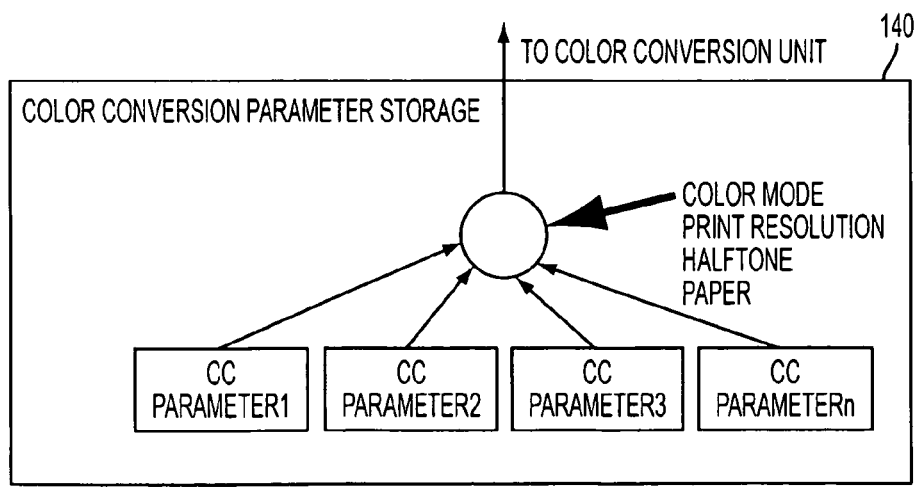
FIG. 2 is a block diagram showing components of a color conversion parameter storage unit used by the conventional color printer shown in FIG. 1.
Figure 4:
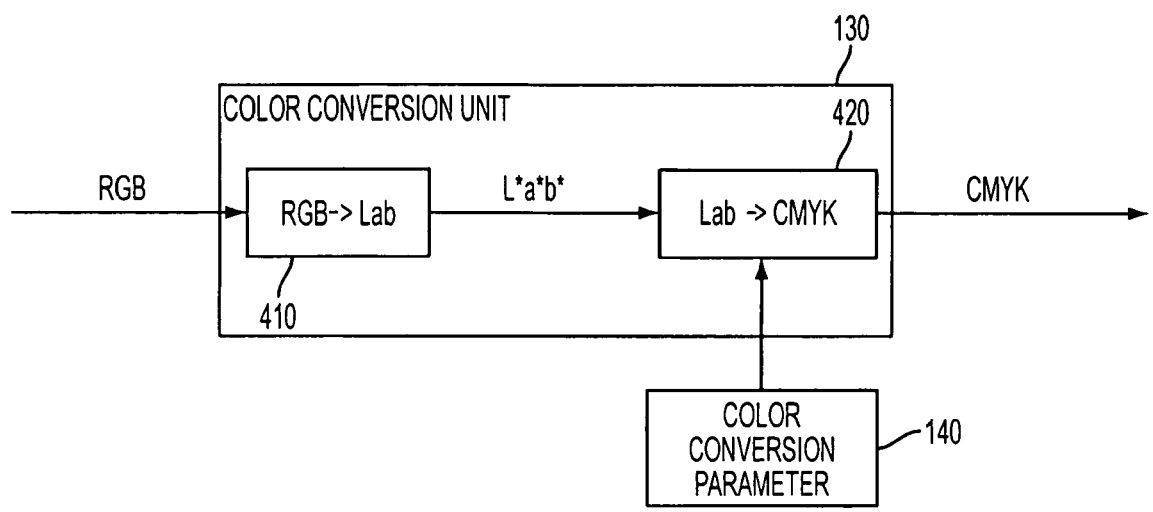
FIG. 4 is a block diagram showing components of a color conversion unit used by the conventional color printer shown in FIG. 1.
Figure 5:
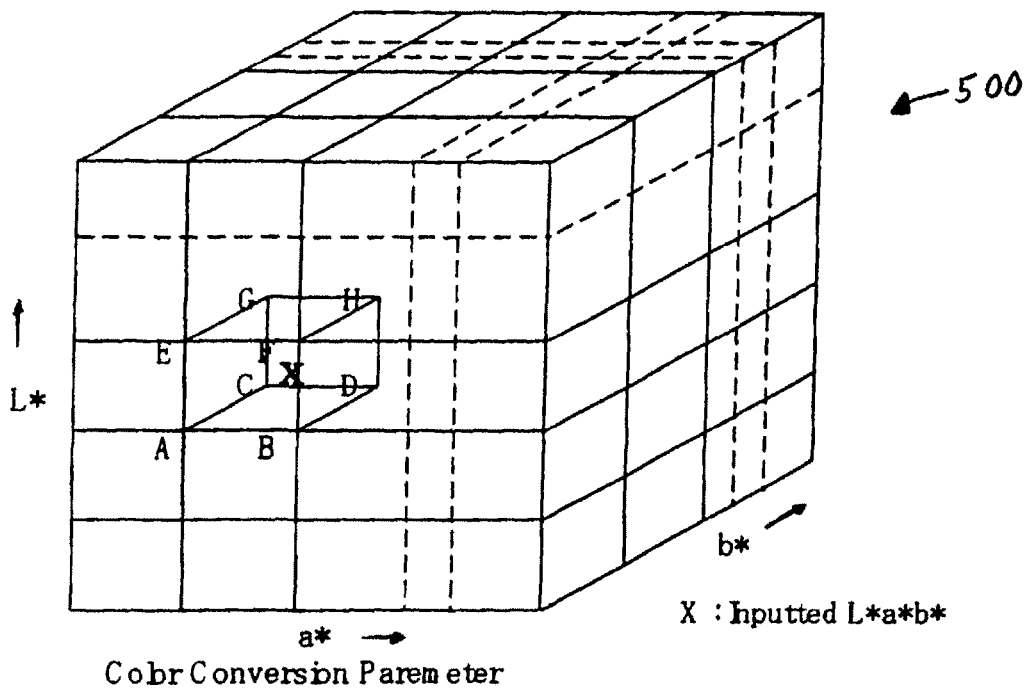
FIG. 5 is a vector space that shows how an L*a*b* value can be converted to a CMYK value by using a color conversion parameter table.
Figure 6:
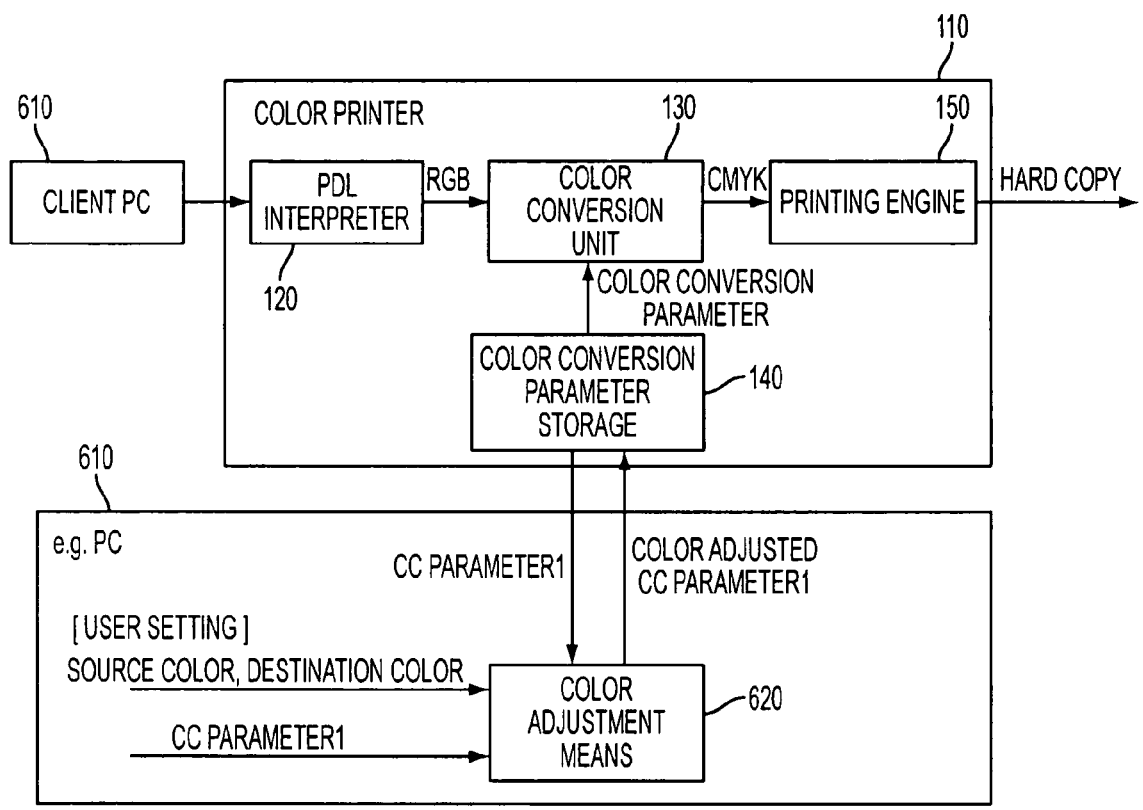
FIG. 6 is a block diagram showing components of a conventional color conversion parameter adjustment system.
Figure 7A:
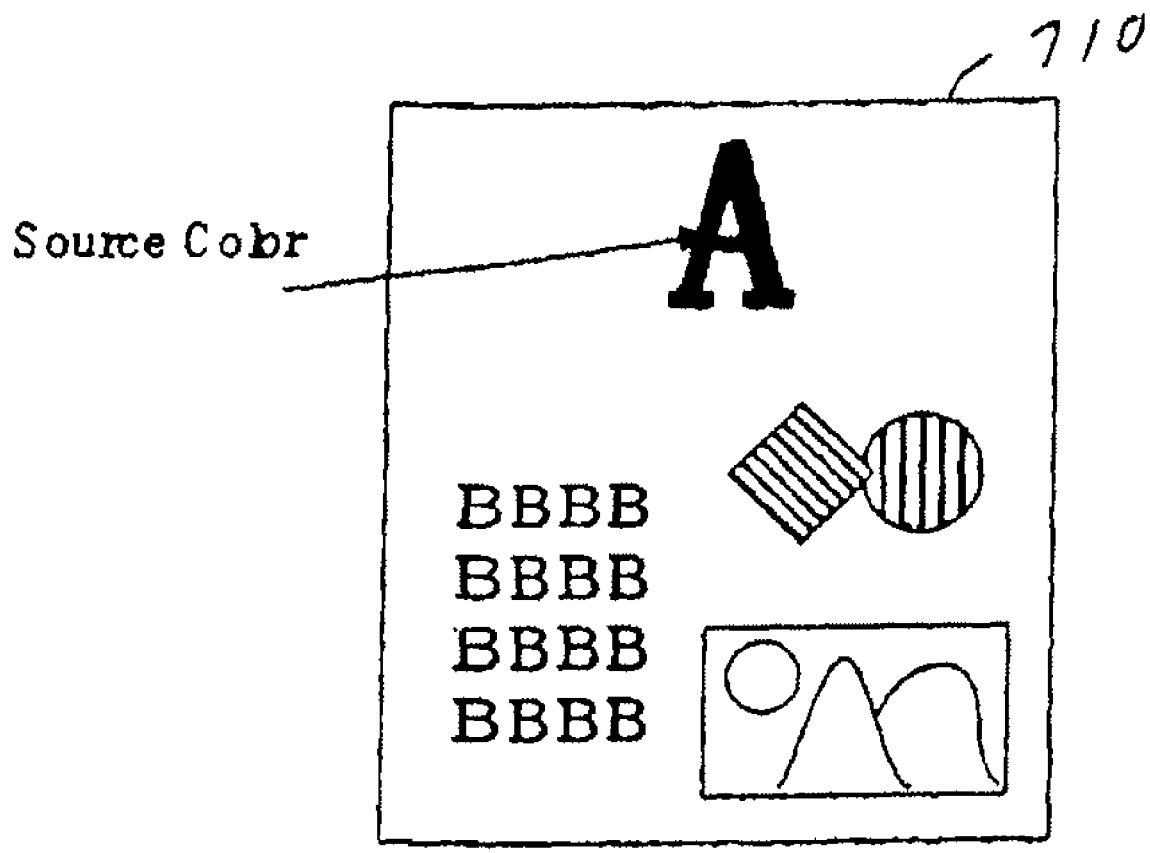
FIG. 7A is a display that can be used to select a source color.
Figure 7B:
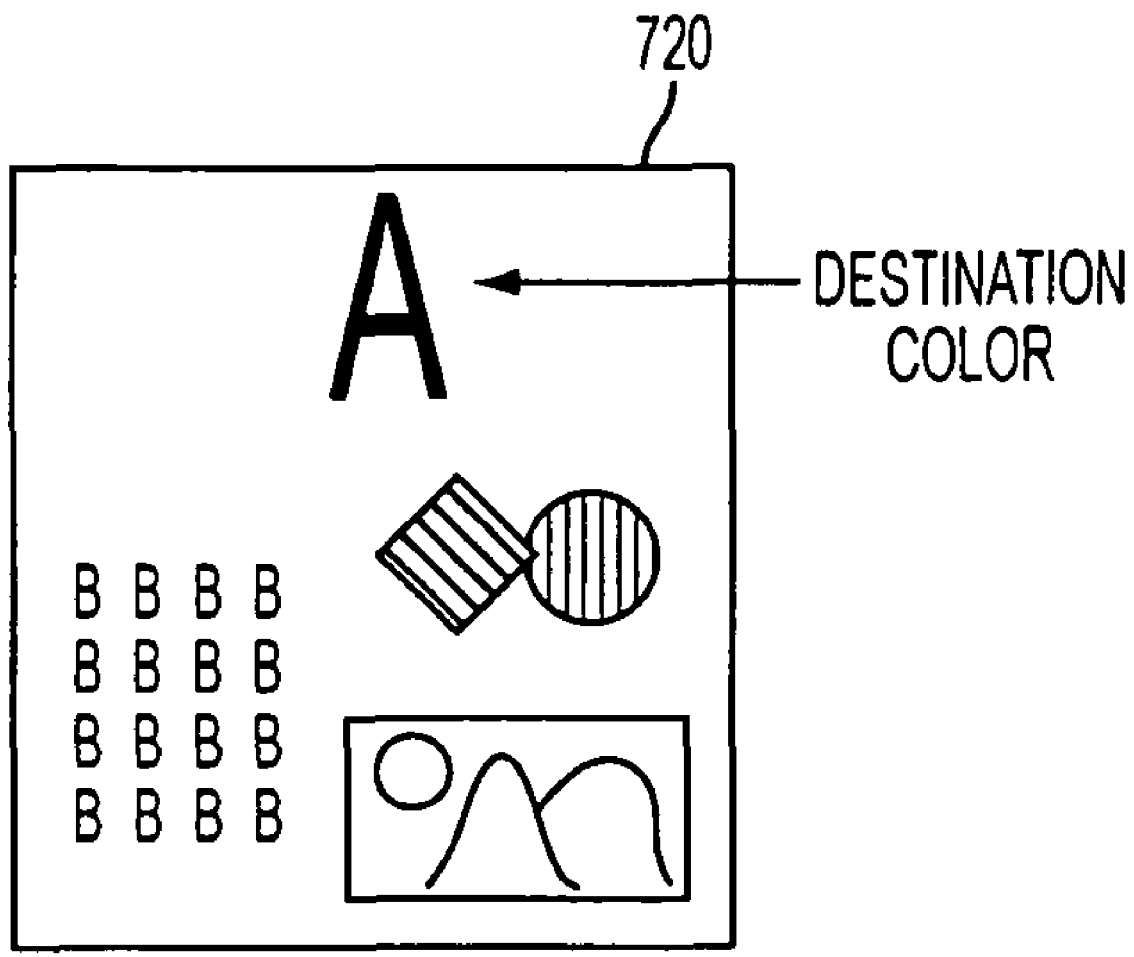
FIG. 7B is a display that can be used to select a destination color.

The color adjustment unit 865 requests the actual selected CCP (e.g., CCP1) from the color conversion parameter storage 850, and downloads the selected CCP from the color conversion parameter storage 850. A user selects a source color and a destination color, similar to the manner shown and discussed with respect to FIGS. 7A and 7B, whereby that information is temporarily stored in the buffer 855, and then output to the color adjustment unit 865. The color adjustment unit 865 adjusts the selected CCP based on the source color and destination color changes provided by way of the buffer 855, and outputs the adjusted CCP to be then stored in the color conversion parameter storage 850. Then, each of the related CCPs is adjusted sequentially, in an automatic manner, without any user intervention. When each CCP is adjusted by the color adjustment unit 865, a regular L*a*b*-to-CMYK conversion table is downloaded from the color conversion parameter storage 850 for the corresponding CCP, whereby an inverse L*a*b*-to-CMYK conversion table may also be downloaded in one possible implementation (to be discussed in detail later).

FIG. 9 shows one possible implementation of the color conversion parameter list 845 that may be utilized in the first embodiment. The color conversion parameter list 845 corresponds to a table that stores information corresponding to: color mode, resolution, halftone, paper type, and color conversion parameter. There are shown three different types of color modes, namely "general", "presentation", and "photographic", while one of ordinary skill in the art will recognize that other types of color modes may be stored in the color conversion parameter list 845 (e.g., desktop publishing, CAD, line art).

As seen in FIG. 9, color conversion parameters CCP1-CCP6 are related as being CCPs used in the 'general' color mode. So, if a user selects one of these color conversion parameters to be adjusted, the other ones will be automatically adjusted in accordance with the first embodiment. Also, color conversion parameters CCP7-CCP2 are shown as being related to each other, as all being CCPs used in the 'presentation' color mode. Thus, if a user adjusts CCP9, then CCP7, CCP8, CCP10, CCP11 and CCP12 will automatically be adjusted as well. Further, color conversion parameters CCP13-CCP15 are shown as being related to each other, as all being CCPs used in the 'photographic' color mode. Thus, in FIG. 9, CCPs are related to each other based on their being in the same color mode. Other modes of relatedness (e.g., based on same resolution, or based on same half-tone type, or based on same paper type) may be envisioned while remaining within the spirit and scope of the invention.

Figure 10A:
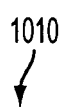
FIG. 10A is a color conversion parameter table that is used by the color conversion parameter adjustment system according to the first or second embodiments.

FIG. 10A shows an exemplary color conversion parameter 1 table 1010 and FIG. 10B shows an inverse color conversion parameter 1 table 1020 that are utilized by the color adjustment unit 865 in accordance with the first embodiment. In a first step, a source color address is selected from the color parameter 1 table 1010, based on the user selected input color S(L*a*b*) in the input color-to-destination color adjustment. In a second step, an address (CMYK) of the inverse color conversion parameter table 1020 is searched corresponding to the destination color D(L*a*b*) selected by the user in the input color-to-destination color adjustment. In a third step, the address (CMYK) searched at the second step is set to the data of the address (L*a*b*) of the color conversion parameter, whereby the address (L*a*b*) is the address in the color conversion parameter table 1010 selected in the first step.

As an example, referring to FIGS. 10A and 10B, assume that a L*a*b* 10, 0, 0 value is selected from the color conversion parameter table 1010, which corresponds to the source color selected by the user. Now, the destination color selected by the user is converted to an L*a*b* value and is used to determine the corresponding CMYK value from the inverse color conversion parameter table 1020. Thus, if the destination color corresponds to L3*a3*b3*=20, 0, 0, then the corresponding CMYK value of 0, 0, 0, 20 is obtained as the address for this L*a*b* value in the inverse color conversion parameter table 1020. Then, the CMYK value of 0, 0, 0, 20 replaces the previous C100, M100, Y100, K100 value stored for the L*a*b*=10, 0, 0 address in the color conversion parameter table 1010.

Once the above has been performed for the selected CCP (e.g., CCP1), the other related CCPs are automatically adjusted in a sequential manner, using the same methodology as described above.

A second embodiment for performing color conversion parameter adjustment will be explained herein, whereby only the color conversion parameter table 1010 of FIG. 10A is utilized. In a first step, an address (L*a*b*) of a selected CCP (e.g., CCP1) is selected corresponding to the user-selected input color S(L*a*b*). In a second step, the color (CMYK) in the color conversion parameter table 1010 corresponding to the address selected in the first step is set to the destination color (CMYK) selected by the user. As an alternative implementation of the second embodiment, the destination color is changed from CMYK to L*a*b* data using the inverse color conversion parameter table 1020.

The first embodiment provides for accurate color, in that the output color (e.g., L*a*b*) for the selected CCP and the related CCPs is the same, whereby the color output difference between a selected CCP and a related CCP may be a little different from each other. The second embodiment provides for pure color, in that the same color amounts (e.g., the amount of ink used during printing) are used for different types of printing, but whereby the output color on the page (e.g., the L*a*b*) may be different based on the print mode selected.

The foregoing description of a preferred embodiments of the invention has been presented for purposes of illustration and description. It is not intended to be exhaustive or to limit the invention to the precise form disclosed, and modifications and variations are possible in light in the above teachings or may be acquired from practice of the invention. The embodiments (which can be practiced separately or, where possible, in combination) were chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method of adjusting a plurality of color conversion parameters, comprising:

receiving, by an input unit, a user input designating a color conversion parameter to be adjusted;

obtaining information as to at least one other color conversion parameter that is related to the user designated color conversion parameter;

adjusting, by a color adjustment unit, the user designated color conversion parameter based on a user selection of source color-to-destination color change, and adjusting the at least one other color conversion parameter related to the user designated color conversion parameter based on the same user selection of source color-to-destination color change;

wherein the at least one other color conversion parameter is related to the user designated color conversion parameter based on whether or not they are utilized in a same color print mode group having a plurality of candidates each of which has a color conversion parameter according to one selected from: a) a plurality of resolution types, b) a plurality of halftones types, or c) a plurality of paper types, wherein, when the color conversion parameter of one of the plurality of candidates is adjusted, the color conversion parameter of all others of the plurality of candidates in the same color print mode group is automatically adjusted.

2. The method according to claim 1, wherein the adjusted color
conversion parameters are stored in a color printer for use in subsequent color print jobs.

3. The method according to claim 1, wherein the color print modes include:
general print mode, presentation print mode, and photographic print mode.

4. The method according to claim 1, wherein the adjusting step comprises:
determining a source L*a*b* value corresponding to the user selection of source color;
determining a CMYK value corresponding to the user selection of destination color; and
replacing a current CMYK value associated with the source L*a*b* value, with the CMYK value determined as corresponding to the user selection of destination color.

5. The method according to claim 4, wherein each of the steps i)-iii) are automatically, sequentially performed for each of the at least one other color conversion parameter that are related to the user designated color conversion parameter.

6. The method according to claim 1, further comprising:
permitting the user to select additional color conversion parameters to be adjusted, concurrently or sequentially with respect to adjustment of the user designated color conversion parameter.

7. The method according to claim 1, wherein, the obtaining step and the adjusting step are automatically performed after the receiving step, without any further user input.

8. A method of adjusting a plurality of color conversion parameters, comprising:
receiving, by an input unit, a user input designating a color conversion parameter to be adjusted;
obtaining information as to at least one other color conversion parameter that is related to the user designated color conversion parameter;
adjusting, by a color adjustment unit, the user designated color conversion parameter based on a user selection of source color-to-destination color change, and adjusting the at least one other color conversion parameter related to the user designated color conversion parameter based on the same user selection of source color-to-destination color change;
wherein the adjusting step comprises:
i) determining a source L*a*b* value corresponding to the user selection of source color;
ii) determining a CMYK value corresponding to the user selection of destination color;
iii) searching an inverse L*a*b*-to-CMYK table for a destination L*a*b* value that is stored at an address corresponding to the CMYK value corresponding to the user selection of destination color; and
iv) updating an L*a*b*-to-CMYK table to store the CMYK value obtained from the inverse L*a*b*-to-CMYK table obtained in the searching step to the CMYK of the source L*a*b* value.

9. The method according to claim 8, wherein each of the steps i)-iv) are automatically, sequentially performed for each of the at least one other color conversion parameter that are related to the user designated color conversion parameter.

10. An image processing apparatus, comprising:
a color conversion designator that is configured to designate a color conversion parameter to be adjusted;
a color conversion parameter list that is configured to store information concerning color conversion parameters that are related to each other, and that is configured to output related color conversion parameters to the selected color conversion parameter when the selected color conversion parameter is input thereto;
a color adjustment unit that is configured to receive the selected color conversion parameter and at least one related color conversion parameter to the selected color conversion parameter, and that is configured to receive a user input corresponding to a source color-to-destination color change,
wherein the color adjustment unit adjusts the selected color conversion parameter and the at least one related color conversion parameter based on the source color-to-destination color change;
wherein the at least one other color conversion parameter is related to the user designated color conversion parameter based on whether or not they are utilized in a same color print mode group having a plurality of candidates each of which has a color conversion parameter according to one selected from: a) a plurality of resolution types, b) a plurality of halftones types, or c) a plurality of paper types,
wherein, when the color conversion parameter of one of the plurality of candidates is adjusted, the color conversion parameter of all others of the plurality of candidates in the same color print mode group is automatically adjusted.

11. The image processing apparatus according to claim 10, wherein the adjusted color conversion parameters are stored in a color printer for use in subsequent color print jobs.

12. The image processing apparatus according to claim 10, wherein the color print modes include:
general print mode, presentation print mode, and photographic print mode.

13. The image processing apparatus according to claim 10, wherein the color adjustment unit comprises:
a first determining unit configured to determine a source L*a*b* value corresponding to the user selection of source color;
a second determining unit configured to determine a CMYK value corresponding to the user selection of destination color; and
a replacing unit configured to replace a CMYK value associated with the source L*a*b* value, with the CMYK value determined as corresponding to the user selection of destination color.

14. The image processing apparatus according to claim 10, wherein the color adjustment unit automatically and sequentially adjusts each of the color conversion parameters that are related to the color conversion parameter that has been adjusted.

15. The image processing apparatus according to claim 10, further comprising:
a user interface that allows the user to select additional color conversion parameters to be adjusted, concurrently or sequentially with respect to adjustment of the user designated color conversion parameter.

16. The image processing apparatus according to claim 10, wherein the adjusting of each of the at least one other color conversion parameter are automatically performed after the user designated color conversion parameter has been adjusted, without any additional user input.

17. An image processing apparatus, comprising:
a color conversion designator that is configured to designate a color conversion parameter to be adjusted;
a color conversion parameter list that is configured to store information concerning color conversion parameters that are related to each other, and that is configured to output related color conversion parameters to the selected color conversion parameter when the selected color conversion parameter is input thereto;
a color adjustment unit that is configured to receive the selected color conversion parameter and at least one related color conversion parameter to the selected color conversion parameter, and that is configured to receive a user input corresponding to a source color-to-destination color change,
wherein the color adjustment unit adjusts the selected color conversion parameter and the at least one related color conversion parameter based on the source color-to-destination color change,
wherein the color adjustment unit comprises:
a first determining unit configured to determine a source $L*a*b*$ value corresponding to the user selection of source color;
a second determining unit configured to determine a CMYK value corresponding to the user selection of destination color;
a searching unit configured to search an inverse $L*a*b*$-to-CMYK table for a destination $L*a*b*$ value that is stored at an address corresponding to the CMYK value corresponding to the user selection of destination color; and
an updating unit configured to update an $Va*b*$-to-CMYK table to store the CMYK value obtained from the inverse $L*a*b*$-to-CMYK table obtained by the searching unit to the CMYK of the source $L*a*b*$ value.

18. The image processing apparatus according to claim 17, wherein the color adjustment unit automatically, sequentially adjusts each of the at least one other color conversion parameter that are related to the designated color conversion parameter to be adjusted.

19. A non-transitory computer readable medium recording a program product for adjusting color conversion parameters to be used by a color printer, the program product comprising machine-readable program code for causing, when executed, one or more machines to perform the following method steps comprising:
receiving a user input designating a color conversion parameter to be adjusted;
obtaining information as to at least one other color conversion parameter that is related to the user designated color conversion parameter;
adjusting the user designated color conversion parameter based on a user selection of source color-to-destination color change, and adjusting the at least one other color conversion parameter related to the user designated color conversion parameter based on the same user selection of source color-to-destination color change;
wherein the at least one other color conversion parameter is related to the user designated color conversion parameter based on whether or not they are utilized in a same color print mode group having a plurality of candidates each of which has a color conversion parameter according to one selected from: a) a plurality of resolution types, b) a plurality of halftones types, or c) a plurality of paper types,
wherein, when the color conversion parameter of one of the plurality of candidates is adjusted, the color conversion parameter of all others of the plurality of candidates in the same color print mode group is automatically adjusted.

20. The non-transitory computer-readable medium according to claim 19, wherein the adjusted color conversion parameters are stored in a color printer for use in subsequent color print jobs.

21. The non-transitory computer-readable medium according to claim 19, wherein the adjusting step comprises:
i) determining a source $L*a*b*$ value corresponding to the user selection of source color;
ii) determining a CMYK value corresponding to the user selection of destination color; and
iii) replacing a current CMYK value associated with the source $L*a*b*$ value, with the CMYK value determined as corresponding to the user selection of destination color.

22. The non-transitory computer-readable medium according to claim 21, wherein each of the steps i)-iii) are automatically, sequentially performed for each of the at least one other color conversion parameter that are related to the user designated color conversion parameter.

23. A non-transitory computer readable medium recording a program product for adjusting color conversion parameters to be used by a color printer, the program product comprising machine-readable program code for causing, when executed, one or more machines to perform the following method steps comprising:
receiving a user input designating a color conversion parameter to be adjusted;
obtaining information as to at least one other color conversion parameter that is related to the user designated color conversion parameter;
adjusting the user designated color conversion parameter based on a user selection of source color-to-destination color change, and adjusting the at least one other color conversion parameter related to the user designated color conversion parameter based on the same user selection of source color-to-destination color change;
wherein the adjusting step comprises:
i) determining a source $L*a*b*$ value corresponding to the user selection of source color;
ii) determining a CMYK value corresponding to the user selection of destination color;
iii) searching an inverse $L*a*b*$-to-CMYK table for a destination $L*a*b*$ value that is stored at an address corresponding to the CMYK value corresponding to the user selection of destination color; and
iv) updating an $L*a*b*$-to-CMYK table to store the CMYK value obtained from the inverse $L*a*b*$-to-CMYK table obtained in the searching step to the CMYK of the source $L*a*b*$ value.

24. The non-transitory computer-readable medium according to claim 23, wherein each of the steps i)-iv) are automatically, sequentially performed for each of the at least one other color conversion parameter that are related to the user designated color conversion parameter.

* * * * *